United States Patent [19]

Dowbenko et al.

[11] 3,960,795

[45] June 1, 1976

[54] HYDROLYZED REACTION PRODUCT OF A POLYEPOXIDE WITH A PHENOLIC COMPOUND HAVING A GROUP HYDROLYZABLE TO CARBOXYL

[75] Inventors: Rostyslaw Dowbenko, Gibsonia; Joseph R. Marchetti, Greensburg, both of Pa.

[73] Assignee: PPG Industries, Inc., Pittsburgh, Pa.

[22] Filed: Aug. 13, 1974

[21] Appl. No.: 497,004

[52] U.S. Cl. .................. 260/29.2 EP; 204/181; 260/28.5 R; 260/29.3; 260/29.4 R; 260/29.4 UA; 260/29.6 NR; 260/47 G; 260/47 EP; 260/47 EQ; 260/47 EN; 260/831; 260/834; 260/837 R
[51] Int. Cl.² .................. C08G 59/16; C08J 3/06; C25D 13/06
[58] Field of Search .................. 260/47 G, 29.2 EP

[56] References Cited
UNITED STATES PATENTS

| | | | |
|---|---|---|---|
| 2,933,520 | 4/1960 | Bader | 260/47 G |
| 3,479,306 | 11/1969 | Safranski | 260/29.2 EP |
| 3,847,849 | 11/1974 | Lackner | 260/29.2 EP |

FOREIGN PATENTS OR APPLICATIONS

| | | | |
|---|---|---|---|
| 589,912 | 12/1959 | Canada | 260/47 G |
| 913,794 | 12/1962 | United Kingdom | 260/47 EP |
| 1,017,699 | 1/1966 | United Kingdom | 260/47 EP |

OTHER PUBLICATIONS

Chemical Abstracts, vol. 72, 1970, No. 66787e, Tokuno et al.

*Primary Examiner*—Murray Tillman
*Assistant Examiner*—A. H. Koeckert
*Attorney, Agent, or Firm*—William J. Uhl

[57] ABSTRACT

Coating compositions applicable by conventional coating techniques as well as by electrodeposition are provided by reacting an epoxy-containing organic material with a compound containing at least one phenolic hydroxyl group and a group hydrolyzable to a carboxyl group. Examples of such hydrolyzable groups include ester groups, amide groups and nitrile groups. Compounds include esters of benzoic, salicylic and diphenolic acids, and phenolphthalein. The resultant product may then be hydrolyzed and solubilized, using any of the known hydrolyzing agents, e.g., aqueous potassium hydroxide, aqueous sodium hydroxide and aqueous solutions of the various amines used in the art.

18 Claims, No Drawings

HYDROLYZED REACTION PRODUCT OF A POLYEPOXIDE WITH A PHENOLIC COMPOUND HAVING A GROUP HYDROLYZABLE TO CARBOXYL

BACKGROUND OF THE INVENTION

In view of the excellent properties of epoxy-based coating compositions, considerable effort has been devoted to developing epoxy-based systems for use in various coating applications, including electrodeposition.

The esterification reaction between certain hydroxy carboxylic acids and epoxy compounds is known in the art. In reacting such compounds, two types of reaction may result due to the chemical nature of the materials used. The hydroxyl groups of the hydroxy acid may react with the epoxide groups to form ether linkages, or the carboxyl group or groups of the acid may react with the epoxide to form ester groups. Both reactions may occur in an uncontrolled reaction to yield products having mixed ether and ester linkages to a non-predetermined degree. Such reaction with the epoxides and acids previously employed have not been tolerable since the ultimate products have not generally been suitable for any practical purpose.

In an attempt to overcome these problems, the art has attempted to optimize the etherification portion of the reaction while minimizing the esterification portion of the reaction (See, e.g., U.S. Pat. Nos. 3,404,018 and 3,410,773). Similarly, the art has attempted to utilize products containing both ester and ether linkages (See, e.g., U.S. Pat. Nos. 3,707,526 and 3,792,112.) The compositions produced using the above techniques suffer from certain disadvantages, including poor cured film saponification resistance, low hydrolysis resistance, and lack of adequate package stability.

SUMMARY OF THE INVENTION

It has now been found that highly useful coating compositions suitable for many coating applications, including electrodeposition, can be prepared by reacting an epoxy-containing organic material with a compound containing at least one phenolic hydroxyl group and a group hydrolyzable to a carboxyl group. Examples of such hydrolyzable groups include ester, amide and nitrile groups. The resultant composition effectively contains blocked carboxyl groups, which upon hydrolysis will unblock, thereby providing the composition with carboxyl functionality to be used for subsequent solubilization. As is recognized in the art, suitable solubilizing agents include the amines such as alkylamines, alkanolamines and the like, ammonia, and various hydroxides such as potassium hydroxide, sodium hydroxide and the like. In most instances, it is desirable to hydrolyze and solubilize the reaction product in one step by utilizing an aqueous solution of the amines or hydroxides.

When used in electrodeposition, the compositions herein deposit on the anode. The resultant appropriately crosslinked films, as well as those applied by conventional coating techniques, are characterized by increased cured film saponification resistance, improved hydrolytic stability, improved salt spray resistance, good hardness, and excellent package stability. Additionally, since the reaction products contain hydroxyl functionality, greater variation in formulation with various crosslinking agents is possible.

Further, the reaction products disclosed herein can be provided with a wide variety of physical properties, such as flexibility, by reacting therewith prior to hydrolysis, active hydrogen-containing polymers such as polyamines, polymeric polyols, polymercaptans, and the like. Finally, highly useful products can be obtained when the reaction products of the instant invention are blended with conventional paint vehicles, such as latices, water-soluble acrylics and the like.

DESCRIPTION OF THE INVENTION

As hereinbefore set forth, the compositions of the instant invention are produced by reacting an epoxy-containing organic material with a compound containing at least one phenolic hydroxyl group and containing at least one group hydrolyzable to a carboxyl group.

The epoxy group-containing organic material can be any monomeric or polymeric compound or mixture of compounds having a 1,2-epoxy group. It is preferred that the epoxy-containing material have a 1,2-epoxy equivalency greater than 1.0, that is, in which the average number of 1,2-epoxy groups per molecule is greater than 1.0. It is preferred that the epoxy compound be resinous, that is, a polyepoxide, i.e., containing more than one epoxy group per molecule. The polyepoxide can be any of the well-known epoxides. Examples of these polyepoxides have, for example, been described in U.S. Pat. Nos. 2,467,171; 2,615,007; 2,716,123; 3,030,336; 3,053,855 and 3,075,999.

A preferred class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be 1,1-bis(4-hydroxyphenyl)ethane, 1,1-bis(4-hydroxyphenyl)isobutane, 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethyene glycol, triethylene glycol, 1,2-propylene glycol, 1,4-bytylene glycol, 1,5-pentanediol, 1,2,6-hexanetriol, glycerol, 2,2-bis(4-hydroxycyclohexyl)propane, and the like.

Another useful class of polyepoxides are those containing oxyalkylene groups in the epoxy molecule. Such oxyalkylene groups are typically groups of the general formula:

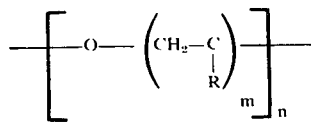

where R is hydrogen or alkyl, preferably lower alkyl (e.g., having 1 to 6 carbon atoms) and where, in most instances, $m$ is 1 to 4 and $n$ is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. As is recognized in the art, such epoxy materials can be produced, for example, by reacting an epoxy-containing material with an alkylene oxide.

The compositions of the instant invention are produced by reacting the epoxy compound with a material containing at least one phenolic hydroxyl group and containing at least one group hydrolyzable to a carboxyl group. The materials to be reacted with the epoxy compound are generally of the formula:

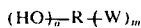

wherein $n$ and $m$ are integers of at least 1 and preferably 1 to 4, wherein R is an organic radical containing at least one aryl group, and wherein at least one of the hydroxyl groups is attached to at least one of the aryl groups of R. W is a group hydrolyzable to a carboxyl group and is preferably selected from the group consisting of $-COOR'$, $-CON(R'')_2$ and $-CN$, where R' is generally a lower alkyl group of from 1 to 4 carbon atoms, and R'' is selected from the group consisting of hydrogen, lower alkyl and mixtures thereof. The aryl group may have other groups attached thereto so long as such groups do not interfere with the reaction of the hydroxy group or groups with the epoxy group or groups of the epoxy compound. Such materials include the alkyl esters of hydroxybenzoic acid, such as methyl, ethyl, isopropyl and butyl p-hydroxybenzoates; methyl, ethyl, isopropyl and butyl m-hydroxybenzoates; methyl, ethyl, isopropyl and butyl o-hydroxybenzoates; p-hydroxybenzamide; N,N-dimethyl-p-hydroxybenzamide; N-ethyl-p-hydroxybenzamaide, N,N-dibutyl-p-hydroxybenzamide, o-hydroxybenzonitrile; m-hydroxybenzonitrile; p-hydroxybenzonitrile; phenolphthalein and related compounds; and the like.

Useful materials also include compounds of the formula:

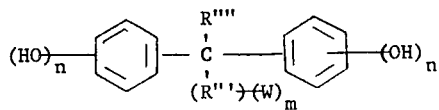

where $n$, $m$ and W are as defined above, where R''' is a divalent organic radical, and where R'''' is selected from the group consisting of H and lower alkyl groups.

Specific usable materials include the alkyl esters of 4,4-bis(p-hydroxyphenyl)pentanoic acid (also known as diphenolic acid), and the like.

It is accordingly to be recognized that essentially any compound containing at least one group hydrolyzable to a carboxyl group can be used in the instant invention. The presently preferred material is methyl p-hydroxybenzoate.

In general, the equivalent ratio of epoxy groups contained in the polyepoxide to hydroxyl groups contained in the hydrolyzable group-containing, phenolic hydroxyl-containing material should be between about 1.0 to 0.25 and 1.0 to 1.25, and preferably 1 to 0.5 and 1.0 to 1.0. It is generally preferred that the carboxyl content of the reaction product be at least equivalent to an acid value of at least about 20 when in an unneutralized state.

In reacting the epoxy-containing organic material and the hydrolyzable group-containing, phenolic hydroxyl-containing material, a catalyst may be used if desired. Suitable catalysts include benzyldimethylamine, benzyltrimethylammonium hydroxide, ethyltriphenylphosphonium iodide, triethylamine, as well as various other tertiary amines known in the art, and Lewis-acid type catalysts such as zinc chloride, boron trifluoride, hydrogen chloride, and the like. In general, where catalysts are employed, they should be used in amounts from 0.01 to 3.0 percent by weight based on the total weight of the epoxy-containing material and the hydrolyzable group-containing, phenolic hydroxyl-containing material. Usually, it is desirable to react the components at elevated temperatures, and for this purpose, temperatures of from 110° to 225°C. are generally acceptable. Of course, it is to be recognized that the reaction temperature can be varied between about the lowest temperature at which the reaction reasonably proceeds and the temperatures indicated above.

A solvent is not necessary, although one is often used in order to afford better control of the reaction. The solvent used preferably should be a non-epoxy reactive solvent and, for that reason, useful solvents include methylbutyl ketone, dioxane, the monoalkyl ethers of ethylene glycol (known as Cellusolves), xylene, toluene, and the like. If desired, a coupling solvent can be added for improved deposited film appearance. These solvents include hydrocarbons, alcohols, esters, ethers and ketones. Specific coupling solvents include isopropyl alcohol, butanol, isophorone, Pentoxone (4-methoxy-4-methyl-2-pentanone), ethylene and propylene glycol, the monoalkyl ethers of ethylene glycol, and 2-ethylhexanol. In general, the coupling solvent, when used, is added after the reaction between the epoxy and the hydrolyzable group-containing, phenolic hydroxyl-containing material is complete.

The reaction between the epoxy-containing material and the hydrolyzable group-containing, phenolic hydroxyl-containing material yields a product effectively containing blocked carboxyl groups, which upon hydrolysis and solubilization yield solubilized products. The reactions involved are believed to occur as follows:

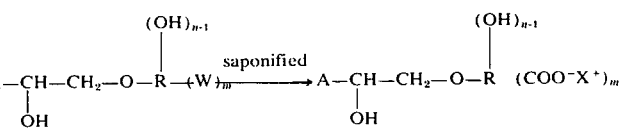

In the above reaction, A represents an organic radical and X represents a cation.

In hydrolyzing the composition of the instant invention, the reaction products may be heated to a suitable temperature in the presence of high pressure steam and substantially solubilized. In one preferred embodiment, the compositions are hydrolyzed in the presence of an aqueous base solution, thereby producing a solubilized product in one step.

Suitable solubilizing agents include inorganic bases such as metal hydroxides, as well as organic bases such as ammonia, amines, or quaternary ammonium compounds. Among the amines which may be used are alkylamines, such as ethylamine, propylamine, dimethylamine, dibutylamine, cyclohexylamine and the like; allylamine, alkanolamines, such as ethanolamines and the like; aralkylamines, such as benzylamine; alkarylamines, such as m-toluidine; cyclic amines, such as morpholine and piperidine; diamines such as hydrazine, ethyl diamine, and the like. Mixtures of solubilizing agents may also be used. The solubilization reaction can be accomplished by mixing the solubilizing base with the hydrolyzed reaction product. Most preferably, however, an aqueous solution of the base is used and such aqueous solution is blended with the unhydrolyzed product. If desired, moderately elevated temperatures may be employed. Essentially any amount of solubilizing agent may be used as long as the desired degree of water solubility is obtained. In general, the amount of solubilizing agent will be dependent upon both the acid value and the amount of ester groups in the reaction product. It is preferable to react one equivalent of solubilizing agent per equivalent ester group, although higher and lower amounts may be used. It is generally preferred to utilize the minimum amount of solubilizing agent necessary to obtain the solubilized product.

In some instances it has been found that the hydrolysis and solubilization of the reaction products disclosed herein using an aqueous amine solution is a slow reaction. It has also been found that the solubilization reaction using an aqueous amine solution does not always result in a fully saponified product. It is accordingly desirable in some instances to first solubilize the product using an aqueous metal hydroxide solution, e.g., sodium or potassium hydroxide. The resultant solubilized product is then reacted with an acid, such as phosphoric acid or sulfuric acid. The resultant product then contains carboxyl groups and the salt formed in precipitated and filtered off. The carboxyl containing product may then be readily solubilized by reaction with an amine.

As hereinbefore indicated, the physical properties of the reaction products herein may be altered by reacting therewith an active hydrogen-containing material. The epoxy-containing organic material and the hydrolyzable group-containing, phenolic hydroxyl-containing material may first be reacted in amounts such that the reaction product contains residual epoxy groups. The reaction product is then reacted with an active hydrogen-containing material, such as polyamines, polymeric polyols, polymercaptans and the like. In choosing active hydrogen materials to be used, care should be taken to avoid the use of highly functional materials which may cause gelation of the product. It is accordingly generally preferred to utilize difunctional active hydrogen-containing materials. Higher functional materials may be used in which case it is preferred that sufficient mono- and difunctional materials be used therewith in amounts such that the average functionality of the mixture is two.

Where active hydrogen-containing materials are used, they may be reacted with the reaction products herein in a variety of different ways. For example, the active hydrogen-containing material may first be reacted with the epoxy-containing material in amounts such that the product thereof contains residual epoxy groups. The resultant product may then be reacted with the hydrolyzable group-containing phenolic hydroxyl material and subsequently hydrolyzed and solubilized. Alternatively, as indicated above, the phenolic hydroxyl material and the epoxy may first be reacted. Subsequently the active hydrogen-containing material may be reacted therewith and the product subsequently hydrolyzed and solubilized. Finally, the phenolic hydroxyl material, the epoxy, and the active hydrogen-containing material may be blended and reacted, with the resultant product subsequently hydrolyzed and solubilized. Where the reaction product is reacted or formed with an active hydrogen-containing material, the amounts of reactants may be varied over a wide range depending upon the equivalent weights of either or both the epoxy compound and/or the phenolic hydroxyl compound.

While the products hereinabove described may be used as the sole resinous component of the coating composition, it is frequently desirable in order to improve or modify film appearance and/or film properties, to incorporate into the composition various non-reactive and reactive compounds or resinous materials, including phenol resins such as allyl ether-containing phenolic resins; triazine resins such as melamine-based resins and benzoguanamine-based resins, especially alkylated formaldehyde reaction products thereof; urea-formaldehyde resins, hydrocarbon resins, and acrylic resins, blocked or semi-blocked polyisocyanates, or combinations thereof. The reaction products herein may also be blended with polyesters, polyamides, and the like. When using such modifying materials, such materials generally comprise from 90 to 10 percent by weight, and preferably from 60 to 30 percent by weight, based on total resinous solids, with the balance being the reaction products disclosed herein.

It is generally preferred that the reaction products described herein be combined with a suitable curing or crosslinking agent. Such materials, as noted above, include aminoplast resins, phenolic resins and blocked or semi-blocked polyisocyanate.

The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formoguanamine, acetoguanamine, ammeline, 2-chloro-4,6-diamino-1,3,5-triazine, 6-methyl-2,4-diamino-1,3,5-triazine, 3,5-diamino triazole, triaminopyrimidine, 2-mercapto-4,6-diaminopyrimidine, 2,4,6-triethyl triamino-1,3,5-triazine, and the like.

While the aldehyde employed is most often formaldehyde, other similar condensation products can be made from other aldehydes or mixtures thereof, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen-substituted or other substituted alcohols, such as 3-chloropropanol and butoxyethanol. The preferred aminoplast resins are substantially etherified with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Methylene-releasing and aldehyde releasing agents, such as paraformaldehyde and hexamethylenetetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utlized to produce these resins include p-phenylphenol, p-tert-butylphenol, p-tert-amylphenol, cyclopentylphenol and unsaturated hydrocarbon-substitued phenols, such as the monobutenyl phenols containing a butenyl group in the ortho, meta, or para position, and where the double bond occurs in various positions in the hydrocarbon chain. A common phenolic resins is phenol formaldehyde resin.

Any blocked or semi-blocked organic polyisocyanate may be used as the curing agent herein. The organic polyisocyanates are blocked with a volatile alcohol, ε-caprolactam, ketoximes, or the like, and will unblock at temperatures above 100°C. These curing agents are well-known in the art.

The curing or crosslinking agents described can be combined with the reaction products in widely varying amounts, but are generally used in amounts ranging from 90 to 10 and preferably 60 to 30 percent by weight, based on total resinous solids.

In addition to the components above, the compositions ordinarily contain other optional ingredients, including any of the pigments ordinarily used in coating compositions of this general class. In addition, various fillers, antioxidants, flow control agents, surfactants, and other such formulating additives may be employed.

The compositions herein can be applied by essentially any coating method, including brushing, spraying, dipping, flow coating and electrodeposition. When used in electrodeposition, the compositions will deposit on the anode. The compositions may be applied over virtually any substrate, including wood, metals, glass, cloth, plastics, foams and the like, as well as over various primers.

The invention will be further described in connection with several examples which follow. These examples are given as illustrative of the invention and are not to be constructed as limiting it to their details. All parts and percentages in the examples and throughout the specification are by weight unless otherwise indicated.

The following examples (Examples A through N) illustrate the production of various types of saponified reaction products.

EXAMPLE A

Into a reactor equipped with heating means, stirrer, reflux condenser, and means for providing an inert gas blanket were charged 976 parts of Epon 1004 (a polyglycidyl ether of Bisphenol A, available from Shell Chemical Company, having a melting point between 95° and 105°C., and an epoxide equivalent of about 976), 142 parts of methyl p-hydroxybenzoate, 112 parts of ethylene glycol monoethyl ether, and 168 parts of methyl butyl ketone.

The mixture was heated to 110°C., at which time 5.6 parts of benzyldimethylamine were added. Heating was continued to 150°C., at which time an exothermic reaction occurred. The mixture was then held at 148°–150°C. for about 2 hours. The reaction mixture was then allowed to cool. When the temperature had decreased to 140°C., a solution of 50.5 parts of potassium hydroxide and 40 parts of deionized water were slowly added. After about 10 minutes (temperature ~100°C.), the addition of the potassium hydroxide solution was complete. Deionized water (1307 parts) was then added.

The resultant product had a pH of 12.4, a percent non-volatile solids content of 37 and a viscosity of 486 centipoises.

EXAMPLE B

Into a reactor equipped as in Example A were charged 650 parts of Epon 1002 (a polyglycidyl ether of Bisphenol A available from Shell Chemical Company, having a melting point of 75° to 85°C., and an epoxide equivalent of about 700), 87 parts of methyl p-hydroxybenzoate, 158 parts of polyoxytetramethylene glycol (molecular weight ~1000) and 158 parts of diethyl carbitol. The mixture was heated to 100°C., at which time 4.5 parts of benzyldimethylamine were added. The reaction mixture was heated to and held at about 150°C. for about 8 hours, at which time 90 parts of hexyl Celosolve were added. The mixture was then allowed to cool. When the temperature had decreased to about 98°C., a blend of 12.8 parts of potassium hydroxide and 20 parts of deionized water were added. Deionized water (1404 parts) was added while continuing cooling of the mixture to room temperature. The resultant composition had a non-volatile solids content of about 36 percent, a pH of 10.9 and a viscosity of 840 centipoises.

EXAMPLE C

To a reactor equipped as in Example A were charged 800 parts of Epon 1002, 107 parts of methyl p-hydroxybenzoate, 202 parts of polyoxytetramethylene glycol (molecular weight ~1000) and 196 parts of diethyl carbitol. The reaction mixture was heated to about 110°C. at which time 5.5 parts of benzyldimethylamine were added. The reaction mixture was heated to and maintained at 145°C. to 148°C. for about 7½ hours, at which time 111 parts of hexyl Cellosolve were added. The mixture was then allowed to cool. When the temperature had decreased to 130°C., a solution of 19.6 parts of potassium hydroxide and 20 parts of deionized water were slowly added. The addition was complete after about 30 minutes (temperature ~120°C). The mixture was then allowed to cool to room temperature. Sufficient deionized water was then added to yield product containing about 36 percent non-volatile solids.

EXAMPLE D

Into a reactor equipped as in Example A were charged 800 parts of Epon 1001 (a polyglycidyl ether of bisphenol A, available from Shell Chemical Company, having a melting point of between 65° and 75°C. and an epoxide equivalent of about 490), 122 parts of methyl p-hydroxybenzoate, 248 parts of polyoxytetramethylene glycol (molecular weight ~620) and 206 parts of diethyl carbitol. The mixture was heated to 140°C. and held at that temperature for about 8 hours, at which time a solution of 38 parts of potassium hydroxide and 50 parts of deionized water were added. The mixture was allowed to cool to room temperature, at which time 326 parts of deionized water were added to yield a 40 percent non-volatile solids solution.

EXAMPLE E

Into a reactor equipped as in Example A were charged 515 parts of Epon 829 (a liquid polyglycidyl ether of Bisphenol A available from Shell Chemical Company, having an epoxide equivalent of about 198) and 187 parts of Bisphenol A. The mixture was heated to 170°C., at which time an exothermic reaction occurred.

The reaction mixture was held at about 185°C. for about 30 minutes, at which time were added 230 parts of polyoxytetramethylene glycol (molecular weight ~1000) and 78 parts of methyl p-hydroxybenzoate, causing a drop in temperature to about 120°C. Benzyldimethylamine (5 parts) was then added and the reaction mixture was heated to and held at 145° to 150°C. for about 15 minutes. While maintaining the temperature at 145° to 150°C., 178 parts of diethyl carbitol were added. The temperature was then held at 145°–150°C. for about 8 hours and was allowed to cool. When the temperature had dropped to 93°C., a solution of 23 parts of potassium hydroxide and about 40 parts of deionized water were added. The mixture was held at about 90°C. for 30 minutes and was then allowed to cool. Ethylene glycol monobutyl ether (241 parts) was then added to the resultant product.

EXAMPLE F

Into a reactor equipped as in Example A were charged 976 parts of Epon 1004, 76 parts of methyl p-hydroxybenzoate, 230 parts of polyoxytetramethylene glycol (molecular weight ~1020) and 225 parts of diethyl carbitol. The reaction mixture was heated to 100°C. at which time about 5 parts of benzyldimethylamine were added. The mixture was heated to 140°–150°C. and held at that temperature for about two hours, at which time 86 parts of diethyl carbitol were added. The temperature was kept at 140°–150°C. for an additional five hours and was then allowed to cool. When the temperature had decreased to 130°C., a solution of 28.1 parts of potassium hydroxide and 30 parts of deionized water were added. Cooling was continued and when the temperature had reached 100°C., 1608 parts of deionized water were added to the reaction mixture.

EXAMPLE G

Into a reactor equipped as in Example A were charged 762 parts of Epon 840 (a polyglycidyl ether of Bisphenol A, available from Shell Chemical Company, having an epoxide equivalent of about 380), 224 parts of nonylphenol and 142 parts of methyl p-hydroxybenzoate. The mixture was heated to 100°C., at which time 5.6 parts of benzyldimethylamine were added. Heating was continued to 150°C., at which time an exothermic reaction occurred. When the temperature had reached 170°C., the mixture was allowed to cool to 160°–165°C. and was held at that temperature for about one hour. The mixture was then allowed to cool. When the temperature had decreased to 110°C., a solution of 45 parts of potassium hydroxide and 30 parts of deionized water was slowly added. After addition of the potassium hydroxide solution was complete, 1000 parts of deionized water and 113 parts of ethylene glycol monoethyl ether were slowly added. The resultant product had a pH of 12.1, a non-volatile solids content of 48, and a viscosity of 1820 centipoises.

EXAMPLE H

Into a reactor equipped as in Example A were charged 772 parts of Epon 828 (a polyglycidyl ether of Bisphenol A, available from Shell Chemical Company and having an epoxide equivalent of 192), 228 parts of methyl p-hydroxybenzoate, 727 parts of polyoxytetramethylene glycol (molecular weight ~620) and 8.6 parts of benzyldimethylamine. The mixture was heated to 150°C. and held at that temperature for about 11 hours, at which time the reaction mixture was allowed to cool. When the temperature had decreased to 90°C., a solution of 29.4 parts potassium hydroxide and 30 parts deionized water were added thereto. The mixture was allowed to cool to room temperature and 1400 parts of deionized water were added thereto.

EXAMPLE I

Into a reactor equipped as in Example A were charged 970 parts of Epon 1001, 265 parts of methyl p-hydroxybenzoate, 137 parts of methylisobutyl ketone, and 3 parts of benzyldimethylamine. The reaction mixture was heated to 135°C. and held at that temperature for about 1 hour, and was then allowed to cool. When the temperature had decreased to 100°C., 204 parts of diethylethanolamine were added. Gradual heating of the mixture was then started. After about 30 minutes (temperature ~140°C), a solution of 28 parts deionized water and 172 parts of ethylene glycol monoethyl ether was added. The temperature was then held at 135° to 140°C. for about 5 hours, after which time 40 parts of deionized water and 100 parts of ethylene glycol monoethyl ether was added. The reaction mixture was held at 130° to 140°C. for an additional 5 hours and was then allowed to cool to room temperature. The resultant product was found to have been saponified to a degree of 10.8 percent.

EXAMPLE J

To a reactor equipped as in Example A were charged 1169 parts of Epon 829, 332 parts of bisphenol A, and 440 parts of methyl p-hydroxybenzoate. The reaction mixture was heated to 185°C., at which time an exothermic reaction occurred. The temperature was then held at 185°C. for about one hour and was allowed to cool. When the temperature had dropped to 160°C., 485 parts of ethylene glycol monoethyl ether were added. When the temperature had reached 120°C., 517 parts of dimethylethanolamine and 130 parts of deionized water were added. The reaction mixture was then held at 110° to 120°C. for about 1 hour at which time 100 parts of deionized water were added. The temperature was then held at 110°C. for about 12 hours and was thereafter allowed to cool to room temperature. Deionized water (1678 parts) was then added, thereby producing a 40 percent non-volatile solids solution.

EXAMPLE K

Into a reactor equipped as in Example A were charged 527 parts of DEN 431 (an epoxy-novolac material of the general formula:

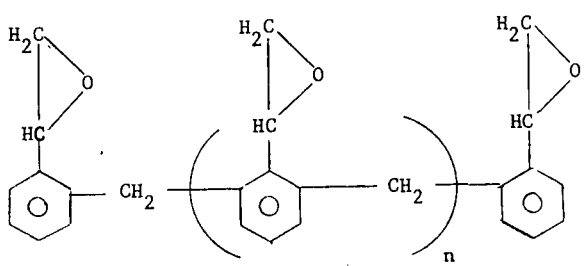

available from Union Carbide, having an epoxide equivalent of 431), 218 parts of methyl p-hydroxybenzoate, 5.4 parts of benzyldimethylamine, 336 parts of nonylphenol and 57 parts of ethylene glycol monoethyl ether. The reaction mixture was heated to 150°C., at which time an exothermic reaction occurred, the temperature was then held at 150° to 160°C. for about 2 hours. The mixture was cooled to 120°C. at which time 64 parts of potassium hydroxide and 60 parts of deionized water were gradually added, with continued cooling. After 10 minutes (temperature 100°C.), the addition was complete. The product was then allowed to cool to room temperature at which time 1439 parts of deionized water were added, thereby yielding a product having 40 percent non-volatile solids.

EXAMPLE L

To a reactor equipped as in Example A were charged 170 parts of Epon 829, and 152 parts of methyl salicylate. The mixture was heated to 180°C. with stirring for 4.5 hours and was then cooled. The product had a solids content of 55 percent and an epoxy equivalent of 400.

Into a similar reactor were charged 160 parts of the above product and 10 parts of potassium hydroxide. The mixture was slowly heated while stirring and 20 parts of potassium hydroxide and 10 parts of deionized water were added. In the 1½ hours of production, the reaction mixture had been heated to 76°C. The resin solution at this time was transparent and completely water soluble. An additional 75 parts of deionized water were then added to reduce the solids content to 60 percent. The resultant product had a Gardner-Holdt viscosity of H-I.

EXAMPLE M

To a reactor equipped as in Example A were charged 81 parts of Epon 829, 23 parts of bisphenol A and 24 parts of 4-cyanophenol. The mixture was heated to 160°C., at which time an exothermic reaction occurred. The temperature was then held at 175° to 185°C. for about 1 hour, after which time the reaction mixture was cooled and 86 parts of butyl Cellosolve were added thereto. When the temperature had dropped to about 95°C., 11 parts of potassium hydroxide and 11 parts of deionized water were added. The reaction mixture was then heated to and held at 105° to 110°C. for 1 hour. The reaction mixture was then allowed to cool to room temperature. The resultant product had a Gardner-Holdt viscosity of Z7- and a solids content of 62 percent. Infrared analysis showed that all the cyano groups had reacted.

EXAMPLE N

Into an open container were charged 2.8 parts of Epon 829 and 5.3 parts of phenolphthalein, together with a small amount of butyl carbitol and ethyltriphenylphsophonium iodide. The mixture was heated to about 200°C. and held at that temperature for about 20 minutes. The resulant product, when saponified with an aqueous potassium hydroxide solution, yielded a purple aqueous solution.

The following examples (1 through 9) illustrate various utilizations of the reaction products disclosed herein.

EXAMPLE 1

A pigment composition was made by grinding (to a Hegman 7 grind) the following materials for two hours in a steel ball mill:

| | Parts by Weight |
|---|---|
| Vehicle resin* | 132 |
| Ethoxymethoxymethylmelamine (Cymel XM-1116, available from American Cyanamid Co.) | 29 |
| Diisopropanolamine | 38 |
| Titanium dioxide | 476 |
| Silica extender (Syloid 161, a magnesium silicate, available from Davison Chemical) | 57 |
| Carbon black | 14 |
| Phthalo blue | 3 |
| Lemon yellow iron oxide | 20 |
| Deionized water | 473 |

*The vehicle resin used was an 80 percent solids acrylic resin comprising 22 percent styrene, 62 percent butyl acrylate and 16 percent methacrylic acid, having a viscosity of 75,700 centipoises and an acid value of 81.5.

The pigment composition comprised 57 percent solids with 46 percent being pigment and 54 percent being resinous vehicle.

The following materials were then blended together:

| | Parts by Weight |
|---|---|
| Acrylic resin* | 106 |
| Product of Example A | 112 |
| Cymel XM-1116 | 7 |
| Diisopropanolamine | 3.8 |
| Pigment composition above | 93 |
| Dibenzyl ether | 8 |
| Deionized water | 1470 |

*The acrylic resin used was a 75 percent solids resin of 23 percent styrene, 9 percent hydroxyethylacrylate, 46 percent butyl acrylate, 7 percent methacrylic acid, and 15 percent Cymel XM-1116, having a viscosity of 9100 centipoises and an acid value of 31.6. The resin was produced in accordance with the disclosure of U.S. Pat. No. 3,403,088.

The composition was then electrodeposited on an iron phosphate steel anode at 300 volts for 90 seconds (bath temperature 80°F.). When baked at 350°F. for 20 minutes an 0.8 mil film of medium gloss was produced.

EXAMPLE 2

A pigment composition was made by grinding (to a Hegman 7 grind) the following materials for 2 hours in a steel ball mill:

|  | Parts by Weight |
|---|---|
| Vehicle resin* | 317 |
| Diisopropanolamine | 26 |
| Surfactant (Triton X165, an ethylene oxide derivative, available from Rohm & Haas) | 18 |
| Liquid Defoamer 913BL (a hydrocarbon derivative, available from Drew Chemical) | 5 |
| Cellosolve | 152 |
| Titanium dioxide | 790 |
| Clay extender (ASP-170, an aluminum silicate, available from Mineral and Chemical Corp.) | 95 |
| Lemon yellow iron oxide | 43 |
| Carbon black | 20 |
| Phthalo blue | 3 |
| Mekon wax (particle size less than 3 microns, available from Warwick Wax, a division of Western Petrochemical) | 7 |

*The vehicle resin used was a 75 percent solids resin comprising 9 percent hydroxyethylacrylate, 23 percent styrene, 46 percent butyl acrylate, 7 percent methacrylic acid and 15 percent Cymel XM-1116, having a viscosity of 9000 centipoises and an acid value of 33.3, produced according to the disclosure of U.S. Pat. No. 3,404,088.

The pigment composition consisted of 80 percent solids with 63 percent being pigment and 37 percent being resinous solids.

A fully capped polyisocyanate was then prepared by reacting one mole of trimethylolpropane, 3 moles of toluene diisocyanate and 3 moles of methylethyl ketone oxime. The capped isocyanate comprised 63 percent solids in methyl butyl ketone.

The following materials were then blended together:

|  | Parts by Weight |
|---|---|
| Pigment composition above | 137 |
| Product of Example B | 585 |
| Capped isocyanate above | 93 |

Deionized water added in an amount sufficient to yield 10 percent total solids.

When electrodeposited on an iron phosphate steel anode at 50 volts for 90 seconds (bath temperature 80°F.) and baked at 350°F. for 20 minutes, an acetone resistant film having an impact strength in excess of 160 inch-pounds, and a pencil hardness of 6H was produced.

EXAMPLE 3

A pigment composition was made by grinding (to a Hegman 7 grind) the following materials for 2 hours in a steel ball mill:

|  | Parts by Weight |
|---|---|
| Vehicle resin* | 179 |
| Diethylamine | 30 |
| Titanium dioxide | 418 |
| Phthalo blue | 279 |
| Dispersing agent (combination oil-soluble sulfonate and non-ionic surfactant - Witco 912) | 7 |
| Deionized water | 340 |

*The resin used was a 97 percent solids maleinized linseed oil having a viscosity of 90,000 centipoises and an acid value of 80.

The pigment composition comprised 70 percent solids with 56 percent being pigment and 44 percent being resinous solids.

|  | Parts by Weight |
|---|---|
| Product of Example C | 625 |
| Cymel XM-1116 | 60 |
| Pigment composition above | 110 |
| Deionized water | 3000 |

The resultant composition comprising 10 percent solids, was then electrodeposited on an iron phosphate steel anode at 200 volts for 90 seconds (bath temperature 80°F.). When baked at 350°F. for 20 minutes, a 0.9 mil glossy film having a 2H pencil hardness and an impact strength of 160 inch-pounds was produced. A 50/50 blend of the acrylic resin of Example 1 and the product of Example C was also drawn down on glass to provide a clear film.

EXAMPLE 4

A pigment composition was prepared by grinding (to a Hegman 7 grind) the following materials for 2 hours in a steel ball mill:

|  | Parts by Weight |
|---|---|
| Vehicle resin of Example 3 | 174 |
| Antioxidant (Tenamine No. 2 Technical Guide, available from Eastman Chemical) | 5 |
| Diethylamine | 35 |
| Strontium chromate | 35 |
| Red iron oxide | 375 |
| Lead silicate | 7 |
| Clay extender (ASP-170) | 278 |
| Witco 912 - Surfactant | 7 |
| Deionized water | 410 |

The pigment component comprised 66 percent solids with 52 percent being pigment and 48 percent being resinous solids.

The following materials were then blended together:

|  | Parts by Weight |
|---|---|
| Product of Example D | 510 |
| Cymel XM-1116 | 60 |
| Pigment composition above | 120 |
| Deionized water | 3000 |

When electrodeposited on an iron phosphate steel anode at 150 volts for 90 seconds (bath temperature 80°F.) and baked at 350°F. for 20 minutes, a 1 mil, glossy film having a pencil hardness of 2H and an impact strength of 160 inch-pounds was produced.

EXAMPLE 5

A pigment composition was prepared by grinding (to a Hegman 8 grind) the following materials for 2 hours in a steel ball mill:

|  | Parts by Weight |
|---|---|
| Tween 21 (an ethylene oxide derivative, available from Atlas Chemical) | 35 |
| Isopropyl alcohol | 41 |
| Foammaster VL (a hydrocarbon derivative, available from Napco Chemical) | 7 |
| Titanium dioxide | 723 |
| Surfactant (Tamol 731, an ethylene oxide derivative, available from Rohm & Haas) | 1.5 |

-continued

| | Parts by Weight |
|---|---|
| Lamp black | 7 |
| Deionized water | 200 |

An electrodepositable composition was then prepared by blending the following:

| | Parts by Weight |
|---|---|
| Product of Example E | 283 |
| Capped isocyanate of Example 2 | 138 |
| Dibutyltin dilaurate | 5.8 |
| Pigment composition above | 121 |
| Deionized water | 3222 |

When electrodeposited on an iron phosphate steel anode at 150 volts for 75 seconds (bath temperature 80°F.) and baked for 17 minutes at 350°F., a 1 mil film was produced having an impact strength of 160 inch-pounds.

EXAMPLE 6

An electrodepositable composition was prepared by blending the following:

| | Parts by Weight |
|---|---|
| Product of Example E | 200 |
| Cymel XM-1116 | 60 |
| Pigment composition of Example 5 | 83 |
| Deionized water | 2290 |

When electrodeposited on an iron phosphate steel anode at 100 volts for 90 seconds (bath temperature 80°F.) and baked for 20 minutes at 350°F., an 0.95 mil film having good appearance and an impact strength of 160 inch-pounds was obtained.

EXAMPLE 7

A pigment composition was made by grinding (to a Hegman 7 grind) the following materials for 2 hours in a steel ball mill:

| | Parts by Weight |
|---|---|
| Vehicle resin of Example 2 | 325 |
| Diisopropanolamine | 15 |
| Cellosolve | 180 |
| Titanium dioxide | 857 |
| Silica extender (Syloid 161) | 96 |
| Lemon yellow iron oxide | 10 |

The pigment composition comprised 79 percent solids with 63 percent being pigment and 37 percent being resinous solids.

Two electrodepositable compositions were then prepared by blending the materials set forth in Table I (all parts being by weight):

TABLE I

| | Composition A | Composition B |
|---|---|---|
| Product of Example F | 539 | 549 |
| Capped isocyanate of Example 2 | 89 | — |
| Cymel XM-1116 | — | 52 |
| Pigment composition above | 155 | 155 |
| Deionized water | 2997 | 3023 |

The two compositions had the properties as set forth in Table II:

TABLE II

| | Composition A | Composition B |
|---|---|---|
| pH | 9.6 | 9.3 |
| Specific conductivity | 820µmhos | 885 µmhos |
| Rupture voltage | 400 volts | 375 volts |

When electrodeposited on an iron phosphate steel anode at 300 volts for 90 seconds (bath temperature 80°F.) and baked at 350°F. for 20 minutes, Composition A yielded a 1.2 mil film having a pencil hardness of 5H and an impact strength of 160 inch-pounds. When Composition B was electrodeposited on the same substrate at 200 volts for 90 seconds and baked for 5 minutes at 350°F., an 0.75 mil film of good properties was obtained.

EXAMPLE 8

A pigment composition was prepared by grinding (to a Hegman 7 grind) the following materials for 2 hours in a steel ball mill:

| | Parts by Weight |
|---|---|
| Vehicle resin of Example 1 | 156 |
| Cymel XM-1116 | 31 |
| Mekon wax | 4 |
| Diethylethanolamine | 26 |
| Zinc oxide | 6 |
| Lemon yellow iron oxide | 115 |
| Carbon black | 27 |
| Titanium dioxide | 487 |
| Deionized water | 371 |

The pigment composition comprised 63 percent solids with 50 percent being pigment and 50 percent being resinous solids.

An electrodepositable composition was then prepared by blending the following:

| | Parts by Weight |
|---|---|
| Acrylic resin (identical to that used to prepare pigment composition of Example 2) | 114 |
| Cymel XM-1116 | 22 |
| Product of Example G | 72 |
| Diisopropanolamine | 5 |
| Pigment composition above | 80 |
| Dibenzyl ether | 7 |
| Deionized water | 1500 |

When electrodeposited on an iron phosphate steel anode at 150 volts for 90 seconds (bath temperature 80°F.) and baked at 350°F. for 5 minutes a glossy, 0.9 mil film was obtained.

EXAMPLE 9

To a reactor equipped as in Example A were charged 1000 parts of Epon 829, 500 parts of Bisphenol A and 110 parts of methyl p-hydroxybenzoate. The mixture was heated to 180°C. at which time an exothermic reaction occurred. The temperature was held at 185°–190°C. for 1 hour, after which time 690 parts of butyl Cellosolve were added. The mixture was then cooled to about 110°C., at which time a solution of 40 parts potassium hydroxide and 40 parts of deionized water were added thereto. The mixture was then held at 110°C. for 30 minutes; after which time 82 parts of 85 percent phosphoric acid was added. The mixture was held at about 100°C. for about 30 minutes, and allowed to cool. The reaction mixture was then filtered. To the filtrate was then slowly added 40 parts of dimethylethanolamine. Deionized water was then slowly added (1708 parts) over a period of about 1 hour while the temperature of the mixture was maintained at 60° to 69°C. The resultant amine-solubilized product had a total non-volatile solids content of 37 percent and a viscosity of 255 centipoises.

The resultant product was then combined with a water-soluble urea-formaldehyde resin (Beetle 65, available from American Cyanamid) in a 70/30 weight ratio (based on solids). The blend was then drawn down on an aluminum substrate using a No. 18 wire bar, and was baked at 500°F. for 65 minutes. A 0.3 mil acetone-resistant film was produced having a pencil hardness of 3H and an impact strength in excess of 80 inch-pounds.

According to the provisions of the patent statutes, there are described above the invention and what are now considered to be its best embodiments; however, within the scope of the appended claims, it is to be understood that the invention can be practiced otherwise than as specifically described.

We claim:

1. A solubilized aqueous composition formed from reacting and then subsequently hydrolyzing
   A. a polyepoxide having an epoxy equivalency greater than 1.0; and
   B. a compound containing at least one phenolic hydroxyl group and containing at least one group hydrolyzable to a carboxyl group and having the following structural formula:

$(HO)_n R{-}(W)_m$ wherein $n$ and $m$ are integers of at least 1 and preferably 1 to 4, wherein R is an organic radical containing at least one aryl group, and wherein at least one of the hydroxyl groups is attached to at least one of the aryl groups of R; W is a group hydrolyzable to a carboxyl group selected from the group consisting of —COOR', —CON(R")$_2$ and —CN, where R' is a lower alkyl group of from 1 to 4 carbon atoms, and R" is selected from the group consisting of hydrogen, lower alkyl and mixtures thereof or wherein (B) is phenolphthalein.

2. The aqueous composition of claim 1, wherein said compound is an alkyl ester of hydroxy benzoic acid.

3. The aqueous composition of claim 2, wherein said alkyl ester of hydroxy benzoic acid is methyl p-hydroxy benzoate.

4. The aqueous composition of claim 2, wherein said alkyl ester of hydroxy benzoic acid is methyl salicylate.

5. The aqueous composition of claim 1, wherein said compound is an alkyl ester of 4,4-bis(p-hydroxyphenyl)pentanoic acid.

6. The aqueous composition of claim 1 wherein said compound is phenol phthalein.

7. The aqueous composition of claim 1 wherein the equivalent ratio of epoxy groups in the epoxy-containing organic material to hydroxyl groups in said compound is between about 1:0.25 and 1:1.25.

8. The aqueous composition of claim 7 wherein said equivalent ratio is between about 1:0.5 and 1:1.

9. A method of preparing an aqueous composition comprising:
   A. reacting a polyepoxide having a 1,2-epoxy equivalency greater than 1.0 with a compound containing at least one phenolic hydroxyl group and containing at least one group hydrolyzable to a carboxyl group having the following structural formula:

$(HO)_n R{-}W)_m$ wherein $n$ and $m$ are integers of at least 1 and preferably 1 to 4, wherein R is an organic radical containing at least one aryl group, and wherein at least one of the hydroxyl groups is attached to at least one of the aryl groups of R; W is a group hydrolyzable to a carboxyl group selected from the group consisting of —COOR', —CON(R")$_2$ and —CN, where R' is a lower alkyl group of from 1 to 4 carbon atoms, and R" is selected from the group consisting of hydrogen, lower alkyl and mixtures thereof or wherein the compound is phenolphthalein; and
   B. hydrolyzing and solubilizing the resultant product.

10. The method of claim 9 wherein the equivalent ratio of epoxy groups in the epoxy-containing organic material to hydroxyl groups in said compound is between about 1:0.25 and 1:1.25.

11. The method of claim 10 wherein said equivalent ratio is between about 1:0.5 and 1:1.

12. The method of claim 9 wherein said compound is an alkyl ester of hydroxy benzoic acid.

13. The method of claim 12 wherein said alkyl ester of hydroxy benzoic acid is selected from the group consisting of methyl p-hydroxy benzoate and methyl salicylate.

14. The method of claim 9 wherein said compound is an alkyl ester of 4,4-bis(p-hydroxy phenyl)pentanoic acid.

15. The method of claim 9 wherein said reaction product is solubilized with a member selected from the group consisting of metal hydroxides, ammonia, amines and quaternary ammonium compounds.

16. The method of claim 15 wherein said reaction product is solubilized with an aqueous metal hydroxide solution.

17. The method of claim 16 wherein said metal hydroxide is potassium hydroxide.

18. The method of claim 16 further comprising the steps of
   C. reacting an acid with the solubilized reaction product;
   D. filtering off the resultant salt formed; and
   E. reacting the filtrate with an aqueous amine solution.

* * * * *